Dec. 8, 1925.  
J. L. KIMBALL  
1,564,682  
REGULATOR  
Original Filed March 7, 1921   2 Sheets-Sheet 1

FIG.1

INVENTOR.  
James Lewis Kimball

Patented Dec. 8, 1925.

1,564,682

UNITED STATES PATENT OFFICE.

JAMES LEWIS KIMBALL, OF SALEM, MASSACHUSETTS, ASSIGNOR TO RUGGLES-KLINGE-MANN MFG. CO., OF SALEM, MASSACHUSETTS, A CORPORATION OF MASSACHUSETTS.

REGULATOR.

Original application filed March 7, 1921, Serial No. 450,376. Divided and this application filed October 23, 1923. Serial No. 670,344.

*To all whom it may concern:*

Be it known that I, JAMES LEWIS KIMBALL, a citizen of the United States, and a resident of Salem, in the county of Essex and Commonwealth of Massachusetts, have invented a new and useful Improvement in Regulators, of which the following is a specification.

The present invention relates to control systems, and more particularly to regulators for regulating the pressure of fluid-pressure systems. The present application is a division of a copending application, Serial No. 450,376, filed March 7, 1921.

Pressure systems are commonly automatically regulated through the agency of pressure devices having diaphragms that are responsive to variations in the pressure of the system. The diaphragm acts upon a scale beam that controls a valve for admitting fluid under pressure to one side or the other of a fluid-operated, "damper"-actuating motor (see the definition of the term "damper" hereinafter given), thereby automatically regulating the pressure of the system so as to maintain it within predetermined limits.

Regulators of the above-described character have a tendency to hunt. Briefly stated, hunting action is a fluctuation of the pressure due to a supply in excess of the demand. An air supply in excess of the boiler load, by producing an excessive blowing period and, therefore, a corresponding idling period, neither of which represents the true load value, will cause hunting. The motor and, therefore, the "damper" controlled thereby, are actuated to a position somewhat beyond that required by the value of the pressure that caused the motor actuation. The pressure is thus caused to build up to a value too far to one side of the normal. The regulator thereupon proceeds to operate in the opposite direction, but does not become checked until the pressure attains a value too far to the other side of the normal. To reduce this hunting effect, various compensating improvements have been introduced, among them a mechanism for gradually counteracting the force exerted by the diphragm upon the scale beam. Sudden and too rapid response of the valve is thereby prevented, and the tendency to hunt is reduced. Hunting has not, however, been completely eliminated.

It is an object of the present invention, therefore, to reduce to a minimum the above-described hunting tendency.

To the accomplishment of this object, the counteracting force upon the diaphragm is exerted, not gradually or uniformly, but step by step, permitting free play for the regulator between steps, but suddenly checking any further action at the limiting points of the steps.

With the above and other objects in view, as will be clear to persons skilled in the art, the invention consists of the improved regulator a preferred embodiment of which is hereinafter described, illustrated in the accompanying drawings, and defined in the appended claims.

As above stated, the present invention relates more particularly to the control or regulation of fluid-pressure systems. The invention is illustrated, in its preferred form, as applied to the regulation of a steam-pressure system (not shown) that operates a steam-pressure device in accordance with the pressure obtaining in the steam-pressure system. The steam-pressure device comprises a pressure chamber 1 that is connected to the steam-pressure system by a steam pipe 3. The pressure chamber 1 contains a diaphragm 2. The diaphragm 2 is thus made responsive to the pressure in the system to operate, through a pressure cap 4, a scale beam 5. The scale beam is intermediately fulcrumed at 6, weights 7 at the other end of the scale beam exerting a force upon the scale beam in opposition to the force exerted by the diaphragm 2.

Figure 1:
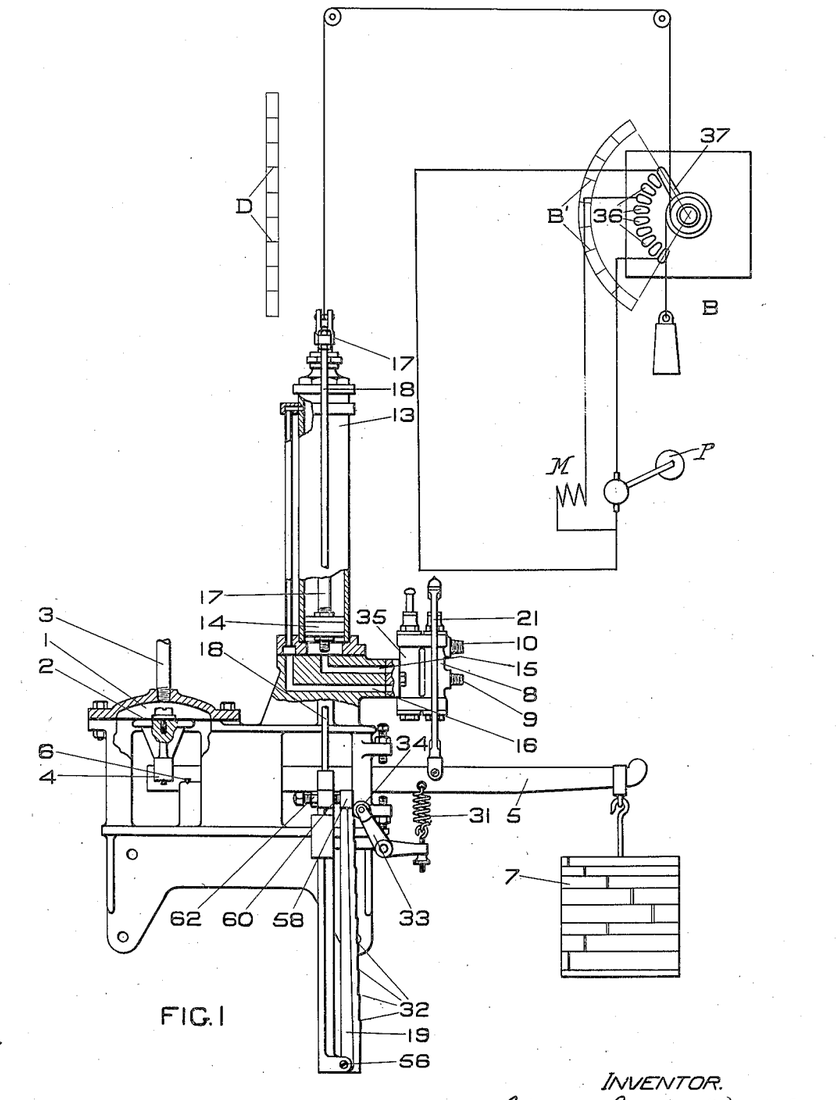
Fig. 1 is a diagrammatic elevation, partly in section, of a regulator constructed according to a preferred embodiment of the present invention.
Figures 2, 3, 4:
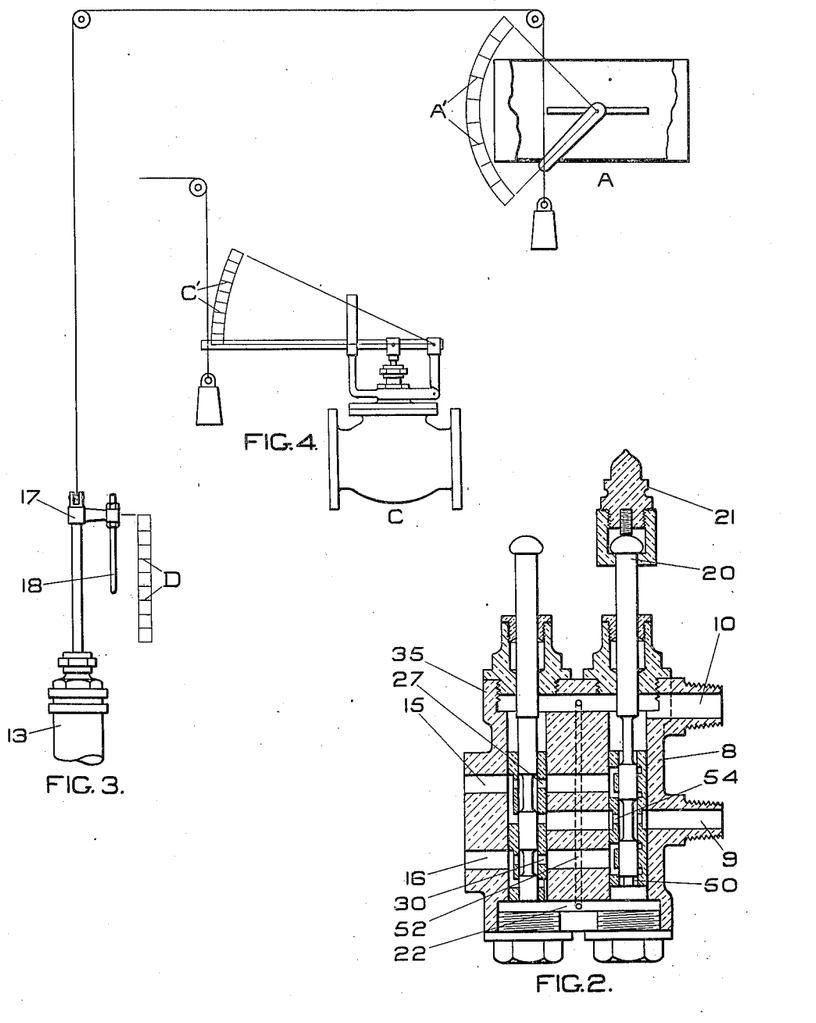
Fig. 2 is an enlarged section of the valves shown in Fig. 1.
Figs. 3 and 4 are diagrammatic views, illustrative of various devices that may be controlled by the regulator of the present invention.

The movements of the scale beam 5 are communicated through a connecting yoke 21, to a valve stem 20 of a pilot valve 8, The valve stem 20 is shown in Fig. 2 as occupying a neutral or ineffective position, in which the valve is closed. The valve stem is adapted to occupy also two effective positions, in one of which it is raised above, and in the other of which it is lowered below, the neutral position shown. When the valve stem becomes raised, upon the pressure in the system exceeding the normal value determined by the weights 7, the valve is adapted to admit water or other fluid under pressure from an independent pressure supply (not shown), through an inlet opening 9, by a port 27 of a safety valve 35, and through a passage 15, to the under side of a fluid-operated motor, the cylinder of which is shown at 13 and the piston at 14. The motor piston 14 will thereupon be raised, the water above the piston exhausting through a passage 16 leading from the top of the cylinder 13, and through ports 30 and 50, to an exhaust chamber 22 that communicates, by a cored or drilled passage 52 in the side of the valve, with an exhaust opening 10. The movement of the motor piston 14 may be communicated, through the piston rod 17, to a flue damper A (Fig. 3) of a steam boiler to effect the closing of the damper to a greater or lesser degree; or to a rheostat B (Fig. 1) for controlling the speed of a pump P or fan V driven by electric motor M; or to a balance-lever valve C (Fig. 4) for controlling the steam pressure or the speed of a fan engine or a turbo blower, or for regulating the speed of a steam-driven pump. These or equivalent controlled devices will be hereinafter included within the term "damper" or the term "valve." A partial or total closing of the damper will shut off, to a corresponding degree, the air supply to the steam-boiler furnace, which will result in correspondingly lowering the steam pressure. This lowering will continue until the pressure reaches a value below normal, whereupon the valve stem 20 will be moved by the diaphragm 2, through the scale beam 5, to its lower effective position, admitting water under pressure through the inlet opening 9, and by port 30 and passage 16, to the upper side of the piston 14. Water will, at the same time, exhaust by way of the passage 15, leading from the lower side of the piston 14, and by the port 27, to the exhaust opening 10. The consequent lowering of the piston 14 will be communicated to the damper to effect an increase in steam pressure. The structure thus far described is old in the art, the piston 14 oscillating above and below a position corresponding to normal steam pressure and yielding the above-described hunting effect.

The preferred mechanism for reducing hunting to a minimum will now be described. Upon the rod 18, that is secured to the piston rod 17 so as to move therewith, is mounted a vertically disposed wedge or cam member 19. The wedge 19 engages a roll 34 at one end of a pivoted bell-crank lever 33, the other end of which is connected by a spring 31 to the scale beam 5. As the motor piston rises, therefore, in response to the movement of the diaphragm 2, as communicated, through the scale beam 5, to the valve stem 20, the wedge 19 will cause the bell-crank lever 33 to impose an increasingly greater tension upon the spring 31. This, in turn, will impart an increasingly greater counteracting force upon the diaphragm 2, preventing sudden or too rapid movement of the valve stem 20 to its lower effective position and, therefore, preventing too rapid movement of the motor piston 14. A similar, but opposite, effect will be obtained on the downward movement of the piston 14 and of the wedge 19 that is movable therewith.

Hunting is prevented to some extent by the above-described structure, but there would still be a tendency for the valve stem 20, and the motor piston 14 controlled thereby, to be moved comparatively considerable distances beyond the positions corresponding to the attainment of normal pressure. The point of cut off, at which the pilot valve stem 20 is returned to its neutral position, would, furthermore, be somewhat indefinite, depending upon the friction of the pilot valve. The present invention, however, minimizes such tendency by providing for increasing the tension in the spring 31, not gradually, but abruptly, or step by step, by successive stages of travel that provide definite points of cut off. According to the preferred embodiment of the invention that is herein illustrated and described, this result is attained by forming a series of steps 32 upon the wedge 19. The valve stem is permitted free play to respond to variations in pressure upon the diaphragm 2 so long as the roll 34 engages any particular step, or is between adjoining stages of travel, but the roll 34 will engage the next succeeding step if the motor piston 14 continues to rise or fall, and this will result in variation of the counteracting force applied, through the spring 31, to the scale beam 5. The bell-crank lever 33 and the spring 31 are thus directly controlled by the wedge 19, so as to react upon the scale beam 5 and, through the latter, upon the valve stem 20 of the stem-pressure device. This reaction has the effect of changing the setting of the pressure device, and, more particularly, of the pressure-responsive diaphragm 2, at each stepped position. Further operation of the motor piston 14 is thus prevented at each stepped position, for the valve stem 20 tends thus to be returned to its neutral position almost immediately upon its being displaced therefrom and simultaneously with the stopping of the motor, the pressure setting is changed a predetermined amount to balance the change in pressure due to a change in the boiler load. No attempt is made to bring the pressure back to normal. If the pressure returns to normal, it is because the load returns to normal. The operation of the piston 14 of the pressure device is thus effected in abrupt steps, and hunting action tends to be prevented.

Most fluctuations in steam pressure are of very small magnitude and do not indicate either a permanently rising or a permanently falling load. A large proportion of these negative changes, if permitted to remain undisturbed, would return to normal without regulation. According to the present invention, no attempt whatever is made to control such slight or negative fluctuations. The sudden changing of the pressure setting of the pressure-responsive device at each of the stepped positions in the operation of the motor causes abrupt cut-off at these positions. But it does more. It renders the regulator non-responsive at these cut-off positions to further variations in pressure until such variations attain further, comparatively large, predetermined values. As the regulator of the present invention is not responsive to such negative fluctuations, unnecessary changes in furnace conditions are avoided, and a fixed furnace condition is more nearly approached.

If the motor piston is rising, for example, an increased counteracting force will be applied to the scale beam at the time that the roll 34 engages a step 32. This will result in lowering the scale beam so as to tend to bring the valve stem 20 back to neutral position. This, in turn, has the immediate effect of partly or wholly shutting off the water-pressure supply through the inlet opening 9 to the motor and, by so much, checking the tendency of the motor to hunt. Usually, the motor will be brought completely to rest. If the pressure continues to vary in the same direction, that is, in the example above, to increase, the increased tension of the spring 31 will soon be overcome and the valve stem will again be moved in the same direction, that is, raised. The motor will then operate again in the same direction until the roll 34 reaches the next step 32. This process will continue, the motor, at each step, stopping to await a further variation in pressure before operating again, until the stroke of the piston has been completed. Similarly, when the pressure in the system decreases, the scale beam 5, and the valve stem 20 controlled thereby, will be lowered, admitting water under pressure above the piston 14 to force the piston downward. When the roll 34 reaches a step 32 on the downward movement of the stepped compensating wedge 19, the tension in the spring 31 will be somewhat released. The scale beam will thereupon rise to effect the closing of the valve. The motor cylinder 14 controlled thereby will be brought to rest. This process will continue until the downward stroke of the piston has been completed. The motor piston, in accordance with the operation of the diaphragm 2, will thus be brought to rest, or accentuated, at definite steps in its operation, corresponding closely to the load on the boiler; and a further variation in the pressure of the system must take place before the motor, and the damper controlled thereby, can be operated further. Whether the movement of the motor piston is up or down, the action of the stepped wedge 19 upon the scale beam, through the spring 31, is to retard the further movement of the piston. The hunting tendency is almost entirely eliminated in consequence of the intermittent varying force thus applied to the scale beam, and a degree of sensitiveness is attained that has not been possible of attainment heretofore. It has been found, in practice, that the flow through the valve is regulated in appreciably exact relation to the demand upon the system, and that the air supply to the furnace is not varied appreciably more than is absolutely necessary to compensate for variations in load conditions.

The stepped stages of travel or compensating points of the motor piston 14 may conveniently be represented upon a graduated scale D. Scales A' (Fig. 3), B' (Fig. 1) and C' (Fig. 4) may be graduated to indicate corresponding units of travel of the respectively controlled devices A (Fig. 3), B (Fig. 1) and C (Fig. 4). As the wedge 19 is shown provided with ten steps 32, the scale D is shown provided with ten divisions. The scales A' (Fig. 3), B' (Fig. 1) and C' (Fig. 4) are therefore also shown provided with ten divisions. If the wedge 19 should be provided with a different number of steps, the scales D, A', B' and C' would be correspondingly graduated. The contact members 36 of the rheostat B are connected to the armature resistor and the field-magnet-winding resistor that the electric motors M of pumps for controlling the pressure of the steam-pressure system are usually supplied with, and the number of the contact members 36 will naturally be the same as the number of wedge steps 32, so that to each step 32 of the wedge will correspond a definite contact member 36. When the motor piston 14 is brought to rest, or accentuated, at definite steps 32, therefore, the contact arm 37 of the rheostat B will be correspondingly brought to rest, or accentuated, when in contact with definite contact members 36.

Maximum draft or air supply should be supplied at the load peak, but not before the peak is reached. A negative change in pressure with a fluctuating boiler load is equivalent to a positive change with a uniform load. The pressure-operating range, that is, the amount that the steam pressure may vary between minimum and maximum air supply to the boiler furnace, or the amount that it varies between minimum and maximum limits of travel of the regulator, must accordingly be wide enough to include the possible variations in load in order that the air supply may be consistent with the boiler load, and an excessive deficiency of the air supply may be avoided. Adjustable means are therefore provided for effecting a varying pressure-operating range between minimum and maximum air supply to the boiler furnace. In the specific embodiment of the invention that is herein illustrated and described, this result is attained by adjusting the angle or taper of the wedge 19. To this end, the wedge is pivoted at one end 56 and the other end 58 is adjustably engaged by a set screw 60 that may be locked in any desired position in any well-known manner, as by a check nut 62. By adjusting the screw 60, furthermore, it is possible to vary the pressure operating range between minimum and maximum demands to meet various conditions of service.

A change in pressure setting is thus effected that is equivalent to that effected at the stepped position plus that effected between stepped positions.

In further illustration of the principles underlying the present invention, let it be assumed, for concreteness, that the regulator is provided with ten non-responsive regulating points. The motor plunger will, therefore, occupy the mid position of its stroke at the fifth step. At this time, the regulator should be balanced to the mean average pressure or boiler load. This may readily be arranged by manually adjusting the scale beam 5 by means of the counter weights 7.

Let it further be assumed, for definiteness, that the mean average pressure is 100 pounds, and that the operating range is five pounds above and below this average pressure. At a pressure of 101 pounds, therefore, the roll 34 is on the sixth step. The motor is caused to operate to adjust the pressure device to balance the load at 101 pounds. The motor does this adjusting automatically. A similar process takes place when the pressure is at 102 pounds, 103 pounds, and so on, up to 105 pounds, at which point there is no load to require air. At all times, the air is supplied in accordance with the load, and not in excess of the load. The boiler load or pressure is thus maintained or balanced at each predetermined value of the boiler load or pressure above or below the mean average setting. Within very narrow limits, the draft does not vary from this value.

A similar effect is obtained with a receding load. When the pressure drops to 99 pounds, the roll 34 is on the fourth step. The pressure thus tends to be maintained at 99 pounds, and there will be no further drop in pressure unless there is a further increase in the load.

At these definite cut-off points, the boiler load is balanced by the air supply and hunting action is, by so much, eliminated.

Modifications may be made by persons skilled in the art without departing from the spirit of the invention, and such modifications are intended to be included within the scope of the invention, as defined in the appended claims.

What is claimed as new is:

1. In a pressure-regulator system, the combination with a fluid system, means for controlling the pressure obtaining in said system, and a pressure device operated in accordance with the pressure obtaining in the fluid system, of a cam member operated by said device for accentuating the positions of said controlling means.

2. In a pressure-regulator system, the combination with a motor-controlling means, and a fluid-pressure-operated device, of a cam member operated by said pressure device for accentuating the positions of said motor-controlling means, and means associated with said cam member for so reacting on said pressure device as to change its setting.

3. In a pressure-regulator system, the combination with a motor-controlling rheostat, and a fluid-pressure device, of a cam member for effecting operation of said rheostat in definite steps in accordance with the operation of said pressure device, and means directly controlled by said cam member for so reacting on said pressure device as to change its setting.

4. In a pressure-regulator system, the combination with a fluid-pressure system, a motor-controlling mechanism, and a pressure device operated in accordance with the pressure obtaining in said fluid system, of a cam member operated by said device for accentuating the positions of said motor-controlling mechanism and for effecting the operation of said device in abrupt steps.

5. In a pressure-regulator system, the combination with a fluid system, means comprising a motor-controlling device for governing the pressure obtaining in said fluid system, and a pressure device operated in accordance with the pressure obtaining in said fluid system for operating said device, of a cam member operated by said device for accentuating the positions of said motor-controlling device, and means actuated by said cam member for reacting on said pressure device to prevent hunting action.

6. In a pressure-regulator system, the combination with a fluid system, a pump for controlling the pressure in said fluid system, a motor for operating said pump, and a rheostat having resistors in circuit with the armature and the field-magnet winding of the motor, of means comprising a pressure device for operating said rheostat in accordance with the pressure obtaining in the fluid system, said means including a cam member operated by said device for accentuating the positions of said rheostat and for opposing further operation of the pressure device.

7. In a pressure-regulator system, the combination with a fluid system, a rheostat, and a fluid-pressure device operated in accordance with the pressure obtaining in said fluid system for operating said rheostat, of means comprising a cam member operated by said device for accentuating the positions of said rheostat.

8. In a pressure-regulator system, the combination with a fluid-pressure system, a pump for controlling the pressure in said system, a motor for operating said pump, and a rheostat having resistors in the circuit of the armature and the field-magnet winding of said motor, of a pressure device operated in accordance with the pressure obtaining in said fluid system for operating said rheostat, and a cam member for accentuating the positions of said rheostat and for reacting on said device to change its setting.

9. In a pressure system, a motor for controlling the pressure in the system, a valve for controlling the motor, a diaphragm controlled in accordance with the said pressure for operating the valve, and compensating means controlled by the motor for counteracting step by step the action of the diaphragm with abruptly increasing and decreasing counter action at the said steps, whereby the valve checks the further operation of the motor at the said steps.

10. In a pressure system, a motor for controlling the pressure in the system, means controlled in accordance with said pressure for controlling the motor, and a stepped compensating wedge movable by the motor for counteracting step by step the action of the controlling means with abruptly increasing and decreasing counteraction at the steps of the wedge, whereby the further operation of the motor becomes checked at the said steps.

11. In a pressure system, means for controlling the pressure in the system, means controlled in accordance with said pressure for controlling the pressure-controlling means, compensating means for counteracting step by step the action of the second-named means with abruptly increasing and decreasing counter action at the said steps, whereby the first-named means becomes checked at the said steps, and means for adjusting the compensating means.

12. In a pressure system, a motor for controlling the pressure in the system, a valve for controlling the motor, a diaphragm controlled in accordance with said pressure for operating the valve, means for counteracting the action of the diaphragm, and means whereby the action of the counteracting means is abruptly increased and decreased step by step in successive stepped positions of the motor, whereby the valve checks the further operation of the motor at the said steps.

13. The combination with a fluid-pressure motor having a movable member, of a pressure device and a controlling valve for operating the movable member of said motor, said motor having an adjustable wedge connected with its movable member, the adjustable wedge having steps, and an arm arranged to be engaged by the steps of the wedge for effecting a stopping of said motor at each stepped position on said wedge.

14. In a pressure system, a motor for controlling the pressure in the system, a valve for controlling the motor, a scale beam connected to the valve, a diaphragm controlled in accordance with said pressure and connected to the scale beam for effecting the operation of the valve, a stepped compensating wedge pivoted at one end to the motor, a bell-crank lever one arm of which is engaged by the steps of the wedge, a spring for counteracting the force exerted by the diaphragm connected at one end to the other arm of the bell-crank lever and at the other end to the scale beam, and means operable at the other end of the wedge for adjusting the wedge.

15. In a pressure system, means for controlling the pressure in the system, means controlled in accordance with said pressure for controlling the pressure-controlling means, compensating means for counteracting step by step the action of the second-named means with abruptly increasing and decreasing counter action at the said steps, whereby the controlling means becomes checked at the said steps, and a scale graduated in units corresponding to the said steps of action of the compensating means for indicating the action of the compensating means.

16. In a pressure system, a motor for controlling the pressure in the system, a valve having a neutral position in which it is ineffective and an effective position in which it controls the operation of the motor, a scale beam connected to the valve, a diaphragm controlled in accordance with the said pressure and connected to the scale beam for effecting the operation of the valve to the effective position, and means for returning the valve to the neutral position, there being a spring connection between the motor and the scale beam.

17. In a pressure system, a motor for controlling the pressure in the system, a valve having a neutral position in which it is ineffective and an effective position in which it controls the operation of the motor, means controlled in accordance with the pressure in the system for operating the valve to the effective position, and means for returning the valve to the neutral position, there being a spring connection between the valve-returning means and the valve-operating means.

18. In a pressure system, a motor for controlling the pressure in the system, a valve for controlling the motor, means controlled in accordance with the said pressure for controlling the valve, and a stepped compensating wedge controlled by the motor and connected to the valve-controlling means for counteracting step by step the action of the controlling means with abruptly increasing and decreasing counter action at the steps of the wedge, whereby the valve checks the further operation of the motor at the said steps.

19. In a pressure system, means for controlling the pressure in the system, means controlled in accordance with the said pressure for controlling the pressure-controlling means, a stepped compensating wedge for counteracting step by step the action of the second-named means with abruptly increasing and decreasing counter action at the said steps, whereby the operation of the first-named means becomes checked at the said steps, and means for adjusting the angle of the wedge.

20. In a pressure system, a motor for controlling the pressure in the system, a controlling element having a neutral position in which it is ineffective and two effective positions in which it controls the operation of the motor and its direction of operation, a pressure-responsive device responsive to variations in pressure in the system, means connecting the pressure-responsive device to the controlling element to actuate the element to the effective positions, stepped compensating means operated by the motor to effect an abrupt operation of the controlling element to its neutral position at a plurality of fixed predetermined points between the limits of operation of the motor, there being a spring connection between the first-named means and the compensating means for effecting a change in pressure setting of the pressure-responsive device, and means to adjust the compensating means to vary the range of pressure setting between the limits of operation of the motor.

21. In a pressure regulator, a motor, two elements having a relative neutral position in which they are ineffective and a relative effective position in which they control the operation of the motor, a pressure-responsive device for relatively actuating the elements to the relative effective position, the device being adjusted to relatively actuate the elements normally at an average pressure setting, and means for changing the pressure setting of the device at fixed, predetermined points in the operation of the motor by predetermined pressure values above and below the average pressure setting and to cause the device to relatively actuate the elements at the said predetermined pressure values, and for relatively returning the elements to the relative neutral position at the said fixed, predetermined points in the operation of the motor.

22. In a pressure system, a motor for controlling the pressure in the system, a valve having a neutral position in which it is ineffective and an effective position in which it controls the operation of the motor, means controlled in accordance with the pressure in the system for operating the valve to the effective position, a compensating stepped wedge connected to the motor so as to move therewith, and means connecting the steps of the wedge with the valve to effect the return of the valve to the neutral position.

23. In a pressure system, a motor for controlling the pressure in the system, means controlled in accordance with the said pressure for controlling the motor, compensating means for counteracting step by step the action of the controlling means with abruptly increasing and decreasing counter action at the said steps, whereby the further operation of the motor becomes checked at the said steps, and means whereby the operation of the motor is unchecked between the said steps.

24. In a pressure system, means for controlling the pressure in the system, means controlled in accordance with the said pressure for controlling the pressure-controlling means, a compensating wedge for counteracting the action of the second-named means, and means for adjusting the wedge.

25. In a fluid system, a fluid motor for controlling the condition of the fluid in the system, a source of fluid for the motor independent of the fluid in the system, and a cam for accentuating the operation of the motor.

26. In combination, a pressure device, two elements having a relative neutral position in which they are ineffective and a relative effective position in which they control the pressure upon the pressure device, means controlled by the pressure device for relatively actuating the elements to the relative effective position, and a stepped cam for relatively returning the elements to the relative neutral position.

27. In combination, a motor, two elements having a relative neutral position in which they are ineffective and a relative effective position in which they control the operation of the motor, means for relatively actuating the elements to the relative effective position, and a stepped cam controlled by the motor for relatively returning the elements to the relative neutral position, whereby the motor is operated in abrupt steps corresponding to the steps of the cam.

28. In combination, a rheostat, a motor for controlling the positions of the rheostat, two elements having a relative neutral position in which they are ineffective and a relative effective position in which they control the operation of the motor, means for relatively actuating the elements to the relative effective position, and a stepped cam for relatively returning the elements to the relative neutral position.

29. In a fluid system, means for controlling the condition of the fluid in the system, two elements having a relative neutral position in which they are ineffective and a relative effective position in which they control the operation of the controlling means, means controlled in accordance with the condition of the fluid in the system for relatively actuating the elements to the relative effective position, and a stepped cam for relatively returning the elements to the relative neutral position.

30. In combination, a pressure device, a motor operable step by step for controlling the pressure upon the pressure device, two elements having a relative neutral position in which they are ineffective and two relative effective positions in which they control the operation of the motor in opposite directions, means controlled by the pressure device for relatively actuating the elements to the relative effective positions, and a stepped cam for relatively returning the elements to the relative neutral position at stepped positions in the operation of the motor.

31. In a fluid system, a motor for controlling the condition of the fluid in the system, a valve for controlling the motor, means controlled in accordance with the condition of the fluid in the system for opening the valve, and a stepped cam controlled by the motor for closing the valve.

32. The combination with a motor and a pressure device, of a controlling valve for said motor having a neutral position and two effective positions, a graduated step compensator associated with said motor, and means for adjusting said compensator to effect the stopping of the motor at each compensating point.

33. In combination, a motor, a controlling valve for the motor arranged normally to occupy a neutral position and having two effective positions, a pressure device for actuating said valve to one or the other of said effective positions, and a graduated step compensator connected with said motor and arranged to apply a varying counteracting force to said pressure device for returning said valve to its neutral position at each compensating point of the motor travel.

34. In a fluid system, means operable step by step for controlling the condition of the fluid in the system, a cam controlled in accordance with the condition of the fluid in the system for accentuating the steps of operation of the controlling means, and means for varying from step to step the operative effect of the cam.

35. In a fluid system, means for controlling the condition of the fluid in the system, two elements having a relative neutral position in which they are ineffective and a relative effective position in which they control the operation of the controlling means, means controlled in accordance with the condition of the fluid in the system for relatively actuating the elements to the relative effective position, and compensating means for counteracting step by step the action of the actuating means to return the elements to the relative neutral position with abruptly increasing and decreasing counteraction at the said steps, whereby the controlling means is operated in abrupt steps corresponding to the said steps of the compensating means.

36. In a fluid system, a motor operable step by step for controlling the condition of the fluid in the system, two elements having a relative neutral position in which they are ineffective and two relative effective positions in which they control the operation of the motor in opposite directions, a pressure device controlled in accordance with the condition of the fluid in the system for relatively actuating the elements to the relative effective positions, a step compensator controlled by the motor for relatively returning the elements to the relative neutral position at stepped positions in the operation of the motor, and means for varying from step to step the pressure setting of the pressure device at which the elements are relatively actuated to the relative effective positions by the pressure device.

37. The combination with a fluid-pressure motor, of a pressure device and a controlling valve for operating said motor, a stepped wedge operated by said motor, means for adjusting the angularity of said wedge, an arm, said steps being arranged to engage the arm for effecting a stopping of said motor at each of the stepped positions on said wedge, and means for changing the pressure setting of the pressure device at each stopping point of the fluid-pressure motor.

38. In a fluid system, a motor for controlling the condition of the fluid in the system, two elements having a relative neutral position in which they are ineffective and two relative effective positions in which they control the operation of the motor, means controlled in accordance with the condition of the fluid in the system for relatively actuating the elements to the relative effective positions, and means controlled by the motor for relatively returning the elements to the relative neutral position, there being an elastic connection between the returning means and the actuating means.

39. In combination, a rheostat, two elements having a relative neutral position in which they are ineffective and a relative effective position in which they control the operation of the rheostat, means for relatively actuating the elements to the relative effective position, and means for relatively returning the elements to the relative neutral position at predetermined points in the operation of the rheostat.

40. In a fluid system, a motor for controlling the condition of the fluid in the system, two elements having a relative neutral position in which they are ineffective and a relative effective position in which they control the operation of the motor, means controlled in accordance with the condition of the fluid in the system for relatively actuating the elements to the relative effective position, and means for relatively returning the elements to the relative neutral position at predetermined points in the operation of the motor.

41. In combination, a pressure device, a motor for controlling the pressure upon the pressure device, two elements having a relative neutral position in which they are ineffective and a relative effective position in which they control the operation of the motor, a member controlled by the pressure device, means actuated by the member to effect the relative actuation of the elements to the relative effective position, and means for relatively returning the elements to the relative neutral position at predetermined points in the operation of the motor.

42. The combination with a fluid-pressure motor, of a pressure device and a controlling valve for operating the motor, an operating member for said valve, means connecting said valve and said operating member, and means for shifting the controlling valve from a pressure to a cut-off position at predetermined points in the movement of the fluid-pressure motor.

43. In a fluid system, a motor for controlling the condition of the fluid in the system, a valve for controlling the motor, means controlled in accordance with the condition of the fluid in the system for opening the valve, and means for closing the valve at predetermined points in the operation of the motor.

44. In combination, a pressure device, a motor for controlling the pressure upon the pressure device, two elements having a relative neutral position in which they are ineffective and two relative effective positions in which they control the operation of the motor in opposite directions, means controlled by the pressure device for relatively actuating the elements to the relative effective positions, and means for relatively returning the elements to the relative neutral position at predetermined points in the operation of the motor.

45. The combination with a fluid-pressure motor, of a pressure device and a controlling valve for operating the motor, an operating member of said valve, means connecting said valve and said operating member, means for shifting the controlling valve from a pressure to a cut-off position at predetermined points in the movement of the fluid-pressure motor, and means for adjusting the second-named means to effect a greater or a less pressure variation acting on the pressure device for a given movement of the fluid-pressure motor.

46. The combination with a fluid-pressure motor, of a pressure device and a controlling valve for operating the motor, a hinged wedge operated by said motor, means for adjusting the angularity of said wedge, an arm held in contact with the adjustable wedge, and means operated by said arm for effecting a stopping of said motor.

47. In a fluid system, a motor for controlling the condition of the fluid in the system, two elements having a relative neutral position in which they are ineffective and a relative effective position in which they control the operation of the motor, means responsive to variations in the condition of the fluid in the system for relatively actuating the elements to the relative effective position, means controlled by the motor for relatively returning the elements to the relative neutral position at predetermined points in the operation of the motor, and means for rendering the regulator non-responsive to predetermined changes in the condition of the fluid in the system at each of the said predetermined positions.

48. In a fluid system, a motor for controlling the condition of the fluid in the system, two elements having a relative neutral position in which they are ineffective and a relative effective position in which they control the operation of the motor, means responsive to variations in the condition of the fluid in the system for relatively actuating the elements to the relative effective position, and means for abruptly returning the elements to the relative neutral position at predetermined points in the operation of the motor to abruptly stop the motor at the predetermined points, the motor being adapted to operate freely between the predetermined points.

49. In a fluid system, a motor for controlling the condition of the fluid in the system, two elements having a relative neutral position in which they are ineffective and a relative effective position in which they control the operation of the motor, a pressure-responsive device controlled in accordance with the condition of the fluid in the system for relatively actuating the elements to the relative effective position, means for relatively returning the elements to the relative neutral position at predetermined points in the operation of the motor and to interrupt the operation of the motor at the said predetermined points, and means for changing the pressure setting of the pressure-responsive device simultaneously with the interruption of the motor operation.

50. In a pressure system, a motor for controlling the pressure in the system, two elements having a relative neutral position in which they are ineffective and a relative effective position in which they control the operation of the motor, a device responsive to variations in the pressure of the system for relatively actuating the elements to the relative effective position, means controlled by the motor for relatively returning the elements to the relative neutral position at predetermined points in the operation of the motor, and means for rendering the said device ineffective to relatively actuate the elements in response to predetermined changes in the pressure of the system at each of the said predetermined positions.

51. In a fluid system, means for controlling the condition of the fluid in the system, a motor for controlling the controlling means, a device responsive to variations in the condition of the fluid in the system for controlling the operation of the motor, and means for stopping the motor at the end of predetermined steps of operation of the motor of predetermined length and for changing the pressure setting of the device at the ends of the said predetermined steps.

52. In a fluid system, means for controlling the condition of the fluid in the system, a motor for controlling the controlling means, a device responsive to variations in the condition of the fluid in the system for controlling the operation of the motor, and means for stopping the motor at predetermined points in the operation of the motor and for changing the setting at which the device operates at the predetermined points.

In testimony whereof, I have hereunto subscribed my name this 19th day of October, 1923.

JAMES LEWIS KIMBALL.